Figure 1:
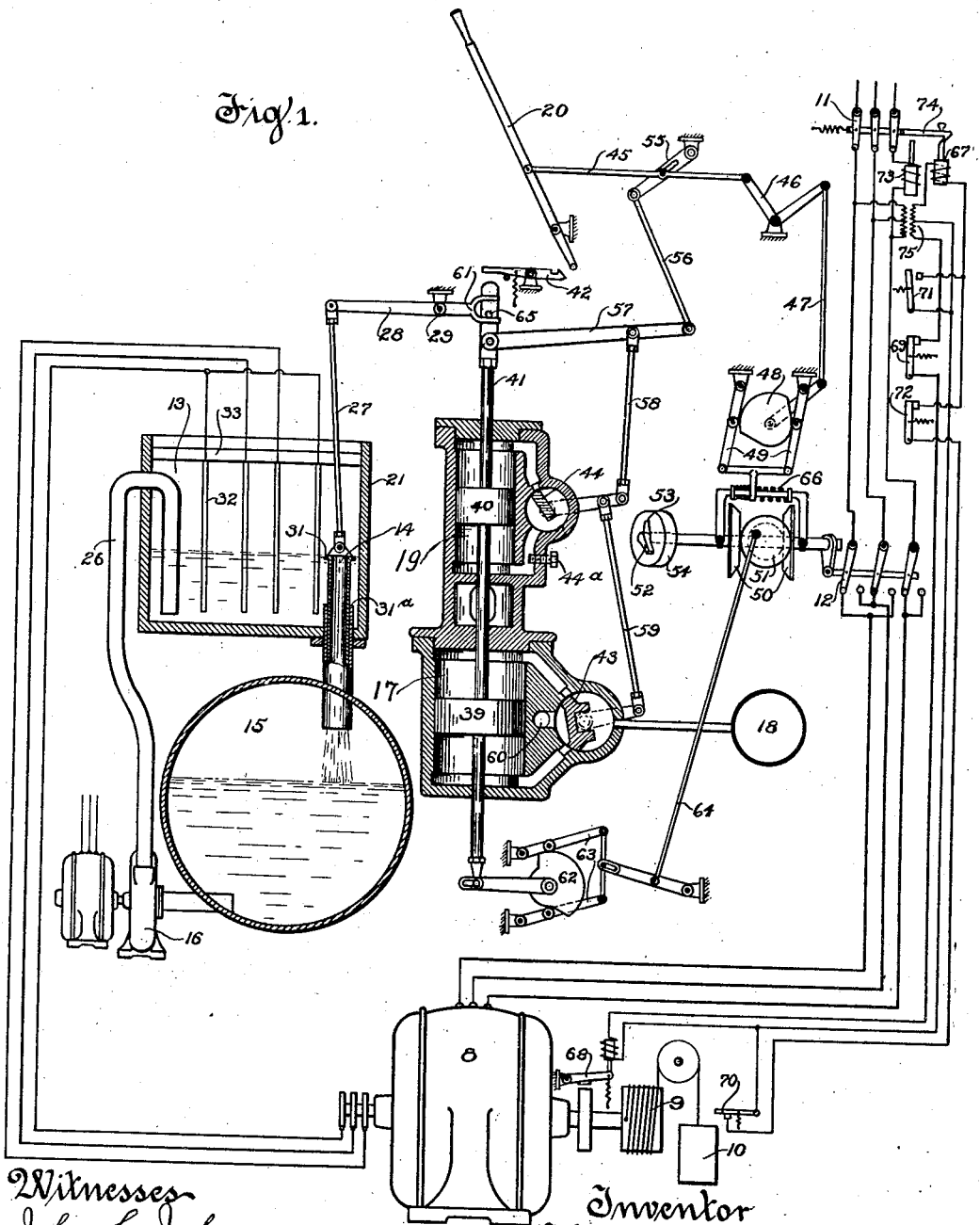

H. W. CHENEY.
MOTOR CONTROL SYSTEM.
APPLICATION FILED APR. 15, 1910.

992,852.

Patented May 23, 1911.

Witnesses
John L. Johnson
Chas. L. Byron

Inventor
Herbert W. Cheney
By Chas. E. Lord
Attorney

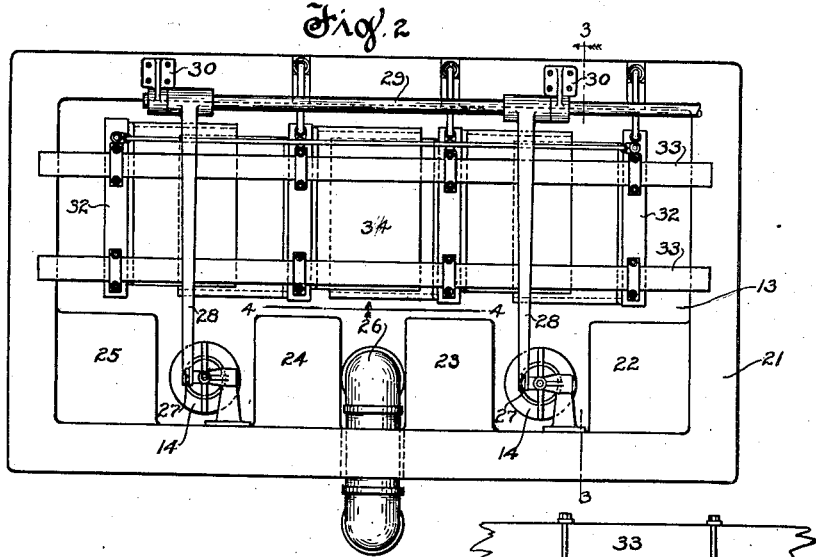
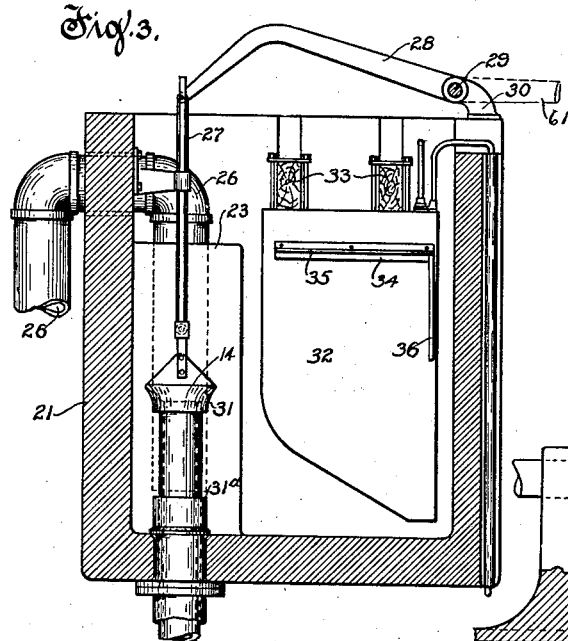
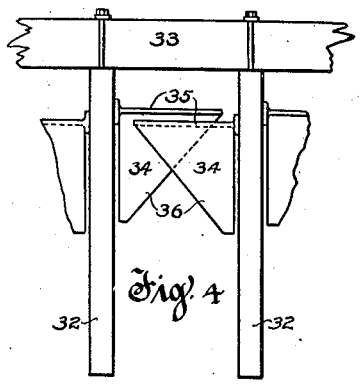
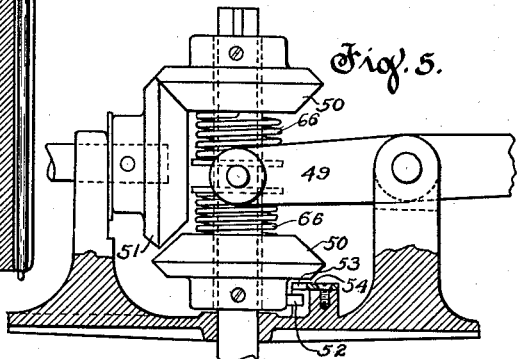

UNITED STATES PATENT OFFICE.

HERBERT W. CHENEY, OF MILWAUKEE, WISCONSIN, ASSIGNOR TO ALLIS-CHALMERS COMPANY, A CORPORATION OF NEW JERSEY.

MOTOR-CONTROL SYSTEM.

992,852.   Specification of Letters Patent.   Patented May 23, 1911.

Application filed April 15, 1910. Serial No. 555,624.

*To all whom it may concern:*

Be it known that I, HERBERT W. CHENEY, a citizen of the United States, residing at Milwaukee, in the county of Milwaukee and State of Wisconsin, have invented certain new and useful Improvements in Motor-Control Systems, of which the following is a full, clear, and exact specification.

My invention relates to motor control systems, and particularly to those where the control is effected by liquid rheostats.

Liquid rheostats when used for controlling motors of large size require considerable power for their operation. I therefore propose to provide a control system in which there is a remotely controlled power-operated liquid rheostat, there being a number of novel features in the system itself as well as in the rheostat proper and its operating means. By reason of these new features, the operator controlling the system has his physical labor materially lightened, the system is protected against accident due to unskilfulness on the part of the operator, and the size of the liquid rheostat proper is much reduced. Moreover, in case the system is a polyphase system, the structure of the rheostat provides for preventing or counteracting any tendency toward unbalancing.
The various novel features of my invention will be apparent from the description and drawings, and will be particularly pointed out in the claims.

Figure 1 is a diagrammatic view showing a system embodying my invention; Fig. 2 is a plan view of a liquid rheostat constructed in accordance with my invention; Fig. 3 is a section on the line 3—3 of Fig. 2; Fig. 4 is a detail view taken substantially on the line 4—4 of Fig. 2; and, Fig. 5 is an elevation of part of the reversing switch and its operating mechanism.

The motor 8 is the motor to be controlled. It may be used for any desired purpose, being illustrated as operating the winding drum 9 of the hoist or elevator 10. It is here shown as a three phase motor having its primary supplied from a suitable source of alternating current through the circuit-breaker 11 and the reversing switch 12, and its wound secondary connected to the plates of a liquid rheostat 13. The resistance of the rheostat is varied by adjusting the level of the liquid therein by varying the height of one or more overflow pipes or weirs 14, the liquid overflowing into a tank 15; from which it is pumped, as by a motor-driven centrifugal pump 16, into the rheostat 13. This continuous circulation of the liquid, which is preferably acidulated water, reduces the temperature of the rheostat and enables a much smaller rheostat to be used for the work than could otherwise be used. The weirs 14 and the reversing switch 12 are operated by an air engine 17, air under pressure being supplied from any suitable source 18. The air engine is provided with an oil lock 19, which prevents its accidental movement. If desired, the oil lock may be omitted, or a suitable dashpot or cataract may be substituted for it. The direction and extent of the movement of the air engine and the relation between the direction of its movement and that of the movement of the reversing switch are controlled by the master control lever 20.

The rheostat 13 has a casing 21, which is preferably provided with four interiorly projecting abutments 22, 23, 24, and 25. This casing may be made of any desired material, concrete being especially suitable. Water is supplied to the casing through the inlet pipe 26, which extends from the pump 16, enters the rheostat near the top, and passes downward almost to the bottom between the abutments 23 and 24. By this means much obnoxious splashing is avoided. In the arrangement shown there are two overflow pipes or weirs 14, these being located respectively between the abutments 22 and 23, and 24 and 25. The abutments prevent the passage of the liquid directly from the inlet pipe to the overflow weirs. The weirs 14 are swung by links 27 from arms 28 fixed on a shaft 29, the latter being preferably supported in bearings 30 on the casing 21. The shaft 29 is rotatable by the air engine 17, through suitable connecting mechanism. The downward movement of the weirs 14 is limited by coöperating shoulders 31 and 31ᵃ, so located that the level of the water in the casing 21 is always sufficiently high to cover the lower ends of the rheostat plates 32. These rheostat plates 32 are suspended from two bars 33 which extend lengthwise across the casing 21 near its top. The bars 33 are preferably of wood or other insulating material, though they may be of conducting material if other suitable provision is made for insulating the plates 32 from one another. There are four plates 32, the two outer plates being connected together and to one lead from the secondary of the motor 8, and the two inner plates being connected to the other two leads respectively.

The distance between the various plates 32 is adjustable so that the resistances of the several phases of the secondary circuit of the motor may be made equal. It is evident, and is found to be the case in practice, that this equality is obtained by making the distance between the two inner plates less than that between either inner plate and the adjacent outer plate. Thus unbalancing of the system is avoided. Near the top on both sides of the inner plates 32 and on the inner sides of the outer plates 32 there are mounted auxiliary plates 34 which have horizontal portions 35 and vertical portions 36. The vertical portions 36 increase extraproportionately the effective superficial conducting area of the plates 32 to which they are attached as the water level in the water rheostat approaches its upper limit; and the horizontal portions 35 which project from the adjacent sides of adjacent plates 32 overlap each other quite closely, as indicated in Fig. 4, so that when the water level in the rheostat reaches its upper limit the main part of the rheostat is in effect short-circuited.

When the master control lever 20 is in the off position and the motor 8 is at rest, the pistons 39 and 40 of the air engine 17 and its oil lock 19 respectively are in their uppermost position, the upper end of their common piston rod 41 holds the latch 42 released from the lower end of the control lever 20, the valves 43 and 44 of the air engine and its lock respectively are in their middle or closed positions, the weirs 14 are in their lowermost or maximum resistance positions, and the reversing switch 12 is in its middle or open position. The circuit-breaker 11 may be either open or closed, and the pump 16 in motion or at rest. To start the motor, the circuit-breaker 11, if open, is closed, and the motor-driven pump 16, if at rest, is started to cause the circulation of the water from the tank 15 to and through the rheostat 13; then the master control lever 20 is moved in the proper direction to obtain the desired direction of rotation of the motor. Assume that the lever 20 is moved to the left. This movement is communicated, through the link 45, the bell crank lever 46, and the link 47, to the cam 48, and the latter operates the levers 49 to throw the right hand bevel gear 50 into engagement with the coöperating gear 51 and to move the finger 52 on the shaft of the gears 50 out of the slot 58 in the plate 54 to the left hand side (Fig. 1) of said plate. The movement of the lever 20 is also communicated, through the link 45, the lever 55, the link 56, the floating lever 57, and the links 58 and 59, to the valves 43 and 44, moving said valves in a counter-clockwise direction to admit air pressure from the source 18 to the space above the piston 39 of the air engine and to connect the space below such piston to the atmosphere through the exhaust 60, and to open the valve 44 to allow oil to pass from the space below the piston 40 to the space above such piston. The rate at which it may pass is determined by the extent of opening of the valve 44; and also, if desired, by a screw 44ª by which the maximum rate may be set. The pressure above the piston 39 now moves such piston and the parts connected therewith in a downward direction. The first part of this movement does not affect the weirs 14 because of the lost motion at the forked arm 61. It does, however, move the cam 62 in a counter-clockwise direction, and causes it to move the levers 63 to operate, through the link 64, the bevel gear 51 in a clockwise direction. This movement of the bevel gear 51, which at this time is in engagement with the right hand gear 50, throws the reversing switch 12 to its left hand position and moves the finger 52 out of registration with the slot 53. The motor 8 now starts in the proper direction with the maximum secondary resistance. The movement of the cam 62 and of the parts operated thereby, is completed during the first small part of the downward movement of the piston rod 41. At the completion of such movement of the cam 62, the pin 65 engages the lower prong of the forked arm 61, and through it operates the shaft 29, arms 28, and links 27 to raise the weirs 14. This raises the level of the water in the rheostat and decreases the resistance of the secondary circuit of the motor 8, thereby increasing the speed of the motor. The piston rod 41 in its downward movement also moves downward the left hand end of the floating lever 57, thus gradually closing the valves 43 and 44. The distance which the piston rod 41 must move in order to close the valves 43 and 44 and stop the movement of the rod, depends upon how far the master control lever 20 has been moved from its off position; for, for each position of the control lever 20, there is a corresponding ultimate position for the piston rod 41 and the parts operated thereby. Thus the level of the water in the rheostat 13 will rise to a height determined by the position of the lever 20.

If it is now desired to stop or to reverse the motor 8, the lever 20 is moved back to its off position, in which position it is immediately locked by the latch 42. Were it not for this latch the lever 20 could be moved at once beyond off position, and in consequence the piston 39 might be caused to move downward to cut out resistance with the reversing switch 12 in the position opposite to the one corresponding to that of the lever 20. Movement of such lever beyond the off position is thus prevented at this time. The movement of the lever 20 to off position throws the valves 43 and 44 to admit air pressure below the piston 39 and to connect the spaces on the two sides of the piston 40, and also operates the cam 48 to throw the levers 49 back to their middle position and put the right hand spring 66 under compression tending to disengage the right hand gear 50 from the gear 51. Such disengagement, however, is prevented at this time by the finger 52 and the plate 54. The air pressure beneath the piston 39 raises such piston and the piston rod 41, and allows the weirs 14 to drop, thus lowering the level of the water in the rheostat and increasing the resistance of the secondary circuit of the motor 8. Downward movement of the weirs 14 continues until the shoulders 31 and 31ª stop it, whereupon the piston rod 41, continuing its upward movement, throws the cam 62 to its central position, thus moving the gear 51 to open the switch 12 and to bring the finger 52 in line with the slot 53. When the finger 52 reaches this position, the right-hand spring 66, which is now compressed, throws the right-hand bevel gear 50 out of engagement with the coöperating gear 51. When the piston rod 41 reaches its upper limit of movement it releases the latch 42 to allow movement of the master control lever 20, and also, acting through the floating lever 57 and the links 58 and 59, closes the valves 43 and 44 to stop such upward movement. The master control lever 20 may now be moved to the right to cause the reversal of the motor 8. For such movement to the right the operation is the same as that described above for movement to the left, save that the cam 48 is moved in a clockwise direction from its central position to cause the left hand bevel gear 50 to coöperate with the gear 51 and to close the reversing switch 12 to the right, and the finger 52 to be moved to the right hand side of the plate 54.

Should the voltage on the supply mains fail at any time, the no-voltage release coil 67 allows its core to drop to release the circuit-breaker 11, the latter then opening automatically. If the motor is running at this time, it will be brought quickly to a standstill by the operation of the electro-mechanical brake 68, the releasing coil of which is energized only when the circuit-breaker 11 is closed. This brake can also be applied at any time, if desired, by opening the switch 69. This may be desirable in stopping the motor 8. If desired, a mechanically or manually operated brake may be used instead or in addition. In case the operator should allow the motor 8 to cause the car 10 to overrun, the car opens a limit switch 70, of which there may be one for each limit of the movement of the car, to break the circuit of the no-voltage release coil 67, thus allowing the circuit-breaker 11 to open and causing the brake 68 to be applied automatically. A switch 71 is provided for short-circuiting the limit switches 70, so that by closing the switch 71 the no-voltage coil 67 may be maintained energized until the motor 8 has been operated far enough in the reverse direction to cause the car 10 to allow the switch 70 to close. An emergency switch 72 may also be provided in the circuit of the no-voltage coil 67, for causing the deënergization of said coil and the consequent opening of the circuit-breaker 11 and application of the brake 68 should such be desired. In case of an overload on the motor 8 the overload coil 73 lifts the latch 74 of the circuit-breaker 11 and releases it from the core of the no-voltage coil 67, thus allowing the circuit-breaker 11 to open and causing the immediate application of the brake 68. The no-voltage coil 67 and the release coil of the brake 68 are preferably supplied through a potential transformer or transformers 75, and the switches 69, 71, and 72 are preferably located conveniently for the operator. These switches may be of the push-button type, the switches 69 and 72 being biased to closed position and the switch 71 to open position.

Many modifications may be made in the precise arrangements shown and described, and all such which do not involve a departure from the spirit and scope of my invention I aim to cover in the following claims.

What I claim as new is:

1. In combination, a casing for a liquid rheostat, electrodes located in said casing, means for pumping a liquid from a source of supply into said casing, and a vertically adjustable overflow weir associated with the casing for determining the height to which the liquid rises in the latter.

2. A liquid rheostat including a casing containing liquid and electrodes within said casing, in combination with a unitary power-operated device for gradually varying the height of the electrodes in relation to the level of the liquid in the casing.

3. In combination, a casing for a liquid rheostat, electrodes in said casing, means for supplying liquid to said casing, a discharge conduit for allowing the liquid to flow out of the casing, and unitary means for gradually varying the height of the entrance to said discharge conduit.

4. A liquid rheostat including a casing and electrodes within the casing, in combination with means for supplying liquid to said casing, an overflow pipe vertically adjustable within said casing, and a fluid engine for adjusting said overflow pipe vertically.

5. A liquid rheostat including a casing and electrodes within the casing, in combination with means for supplying liquid to said casing, an overflow pipe vertically adjustable within said casing, a fluid engine for moving said overflow pipe vertically, and a liquid lock for preventing accidental movement of said fluid engine.

6. In combination, a liquid rheostat having a tank and electrodes within the tank, means for supplying liquid to said tank, an overflow conduit associated with said tank, a fluid engine for varying the height of the entrance to said overflow conduit, and means for controlling the operation of said fluid engine both manually and by the movement produced by the engine.

7. In combination, a liquid rheostat comprising a casing and electrodes within the casing, a fluid engine for varying the height of the electrodes in relation to the level of the liquid within said rheostat, and means for controlling said engine both manually and by its own movement.

8. In combination, a liquid rheostat comprising a casing and electrodes within the casing, a fluid engine for varying the height of the electrodes in relation to the level of the liquid within said rheostat, means for controlling said engine both manually and by its own movement, and a liquid lock for preventing movement of said engine unless such movement is produced by the pressure of the fluid supplied to the engine.

9. In combination, a casing for a liquid rheostat, electrodes within the casing, means for supplying liquid to said casing, an overflow weir associated with the casing, a fluid engine for moving said weir vertically, and means for controlling said engine both manually and by its own movement.

10. In combination, a casing for a liquid rheostat, electrodes within the casing, means for supplying liquid to said casing, an overflow weir within the casing, a fluid engine for moving said weir vertically within the casing, means for controlling said engine both manually and by its own movement, and a liquid lock for preventing movement of said fluid engine save when motive fluid is supplied to it.

11. In combination, a variable resistance, a reversing switch, a fluid engine, and mechanical connections whereby said fluid engine by movement in a given direction may operate said reversing switch in either direction and varies said resistance.

12. In combination, a variable resistance, a reversing switch, a fluid engine, mechanical connections whereby said fluid engine operates said reversing switch and varies said resistance, and means for controlling said fluid engine both manually and by its own movement.

13. In combination, a variable resistance, a reversing switch, a fluid engine, mechanical connections whereby said fluid engine operates said reversing switch and varies said resistance, and means for reversing the relation between a given movement of the fluid engine and the resultant movement of the reversing switch.

14. In combination, a variable resistance, a reversing switch, a fluid engine, mechanical connections whereby said fluid engine operates said reversing switch and varies said resistance, means for reversing the relation between a given movement of the fluid engine and the resultant movement of the reversing switch, and means for preventing such reversal save when the reversing switch is open.

15. In combination, a variable resistance, a reversing switch, a fluid engine, mechanical connections whereby said fluid engine operates said reversing switch and varies said resistance, means for reversing the relation between a given movement of the fluid engine and the resultant movement of the reversing switch, and means for controlling said fluid engine both manually and by its own movement.

16. In combination, a variable resistance, a reversing switch, a fluid engine, and mechanical connections from said engine to said resistance and said switch whereby a movement of the engine from one limit of its movement first closes said switch and then reduces such resistance.

17. In combination, a variable resistance, a reversing switch, a fluid engine, mechanical connections from said engine to said resistance and said switch whereby a movement of the engine from one limit of its movement first closes said switch and then reduces such resistance, and means for controlling said engine.

18. In combination, a variable resistance, a reversing switch, a fluid engine, mechanical connections from said engine to said resistance and said switch whereby a movement of the engine from one limit of its movement first closes said switch and then reduces such resistance, and means for reversing the direction in which such movement of the engine closes such reversing switch.

19. In combination, a variable resistance, a reversing switch, a fluid engine, mechanical connections from said engine to said resistance and said switch whereby a movement of the engine from one limit of its movement first closes said switch and then reduces such resistance, means for reversing the direction in which such movement of the engine closes such reversing switch, and means for preventing such reversal save when the reversing switch is in open position.

20. In combination, a variable resistance, a reversing switch, a fluid engine, mechanical connections from said engine to said resistance and said switch whereby a movement of the engine from one point of its movement first closes said switch and then reduces such resistance, and means for controlling said fluid engine both manually and by its own movement.

21. In combination, a variable resistance, a reversing switch, a fluid engine, mechanical connections from said engine to said resistance and said switch whereby a movement of said engine from one limit of its movement first closes said switch and then reduces such resistance, and means for controlling said fluid engine both manually and by its own movement and for reversing the relation between a movement of the fluid engine and the resultant movement of the reversing switch.

22. In combination, a variable resistance, a reversing switch, a fluid engine, mechanical connections from said engine to said resistance and said switch whereby a movement of said engine from one limit of its movement first closes said switch and then reduces such resistance, means for controlling said fluid engine both manually and by its own movement and for reversing the relation between a movement of the fluid engine and the resultant movement of the reversing switch, and means for preventing such reversal save when said engine is at its aforesaid limit of movement.

23. In combination, a variable resistance, a reversing switch, a fluid engine, mechanical connections from said engine to said resistance and said switch whereby a movement of the engine from one point of its movement first closes said switch and then reduces such resistance, means for controlling said fluid engine both manually and by its own movement, and means for preventing movement of the manually operated means for controlling the fluid engine from one side of the off position to the other save when the engine is at the aforesaid point.

24. In combination, a fluid engine, a reversing switch, and means for mechanically connecting said reversing switch to said fluid engine so that a given movement of the engine may operate the reversing switch in either direction.

25. In combination, a fluid engine, a reversing switch, means for mechanically connecting said reversing switch to said fluid engine so that a given movement of the engine may operate the reversing switch in either direction, and means for preventing the breaking of such mechanical connection save when the reversing switch is in open position.

26. In combination, a fluid engine, a reversing switch, and means arranged when moved on either side of a neutral position to control in the same manner the supply of fluid to said engine and when moved on opposite sides of the neutral position to make mechanical connections between the engine and the switch so that the same movement of the engine causes opposite movements of the switch.

27. In combination, a fluid engine, a reversing switch, means arranged when moved on either side of a neutral position to control in the same manner the supply of fluid to said engine and when moved on opposite sides of the neutral position to make mechanical connection between the engine and the switch so that the same movement of the engine causes opposite movements of the switch, and means for preventing said controlling means from moving from one side of neutral position to the other save when the reversing switch is open.

28. In combination, a fluid engine, a reversing switch, means arranged when moved on either side of a neutral position to control in the same manner the supply of fluid to the engine and when moved on opposite sides of the neutral position to make mechanical connections between the engine and the switch so that the same movement of the engine causes opposite movements of the switch, and means for preventing the breaking of such mechanical connections save when the reversing switch is open.

29. In combination, an electric motor, a variable resistance in circuit therewith, a reversing switch in the supply circuit of said motor, and unitary power-operated means arranged when moved in one direction from one limit of its movement first to close said reversing switch and second to reduce the amount of such resistance in circuit with the motor.

30. In combination, an electric motor, a variable resistance in circuit therewith, a reversing switch in the supply circuit of said motor, unitary power-operated means arranged when moved in one direction first to close said reversing switch and second to reduce the amount of such resistance in circuit with the motor, and means for reversing the direction in which the initial movement of such power-operated means in said direction closes the reversing switch.

31. In combination, a liquid rheostat comprising a casing and electrodes within the casing, power-operated means for varying the height of the electrodes relatively to the level of the liquid within the rheostat, and means for controlling said power-operated means both manually and by the movement it produces.

32. In combination, a casing for a liquid rheostat, electrodes within the casing, means for supplying liquid to said casing, an overflow weir associated with the casing, power-operated means for moving said weir vertically, and means for controlling said power-operated means both manually and by the movement it produces.

33. In combination, a variable resistance, a reversing switch, a power-operated device, and mechanical connections between said device, said resistance, and said switch whereby said device by movement in a given direction may operate said reversing switch in either direction and varies said resistance.

34. In combination, a variable resistance, a reversing switch, a power-operated device, mechanical connections between said device, said resistance, and said switch whereby said device by movement in a given direction may operate said reversing switch in either direction and varies said resistance, and means for controlling said device both manually and by its own movement.

35. In combination, a variable resistance, a reversing switch, a power-operated device, mechanical connections whereby said device operates said reversing switch and varies said resistance, and means for reversing the relation between a given movement of said device and the resultant movement of the reversing switch.

36. In combination, a variable resistance, a reversing switch, a power-operated device, mechanical connections whereby said device operates said reversing switch and varies said resistance, means for reversing the relation between a given movement of said device and the resultant movement of the reversing switch, and means for preventing such reversal save when the reversing switch is open.

37. In combination, a variable resistance, a reversing switch, a power-operated device, mechanical connections whereby said device operates said reversing switch and varies said resistance, means for reversing the relation between a given movement of said device and the resultant movement of the reversing switch, and means for controlling said device both manually and by its own movement.

38. In combination, a variable resistance, a reversing switch, a power-operated device, and mechanical connections from said device to said resistance and said switch whereby a movement of said device from one limit of its movement first closes said switch and then reduces said resistance.

39. In combination, a variable resistance, a reversing switch, a power-operated device, mechanical connections from said device to said resistance and said switch whereby a movement of said device from one limit of its movement first closes said switch and then reduces said resistance, and means for reversing the direction in which such movement of said device closes said reversing switch.

40. In combination, a variable resistance, a reversing switch, a power-operated device, mechanical connections from said device to said resistance and said switch whereby a movement of said device from one limit of its movement first closes said switch and then reduces said resistance, means for reversing the direction in which such movement of said device closes said reversing switch, and means for preventing such reversal save when the reversing switch is in open position.

41. In combination, a reversing switch, a power-operated device, and means for mechanically connecting said device to said switch so that a given movement of the former may operate the latter in either desired direction.

42. In combination, a reversing switch, a power-operated device, means for mechanically connecting said device to said switch so that a given movement of the former may operate the latter in either direction, and means for preventing breaking of said mechanical connection save when the reversing switch is in open position.

43. In combination, a variable resistance, a reversing switch, and unitary power-operated operating means which when moved from one limit of its movement may close said switch in either direction and reduces such resistance.

44. In combination, a reversing switch, a power-operated device, and means arranged when moved on either side of a neutral position to control in the same manner the supply of energy to said device and when moved on opposite sides of the neutral position to make mechanical connections between said device and said switch so that the same movement of said device causes opposite movements of the switch.

45. In combination, a reversing switch, power-operated operating means therefor, and means whereby the same movement of said operating means may be made to produce at will opposite movements of said reversing switch.

Milwaukee, Wis., April 12, 1910.

In testimony whereof I affix my signature, in the presence of two witnesses.

HERBERT W. CHENEY

Witnesses:
  GEO. B. SCHLEY,
  CHAS. L. BYRON.